United States Patent
Hendrix et al.

(10) Patent No.: US 7,620,380 B2
(45) Date of Patent: Nov. 17, 2009

(54) ADJUSTABLE AUTOMATIC GAIN CONTROL

(76) Inventors: Jon David Hendrix, 1351 Thompson Ranch Rd., Wimberley, TX (US) 78676; Michael R. May, 1213 Shannon Oaks Trail, Austin, TX (US) 78746

(*) Notice: Subject to any disclaimer, the term of this patent is extended or adjusted under 35 U.S.C. 154(b) by 435 days.

(21) Appl. No.: 11/388,795

(22) Filed: Mar. 24, 2006

(65) Prior Publication Data
US 2007/0224959 A1 Sep. 27, 2007

(51) Int. Cl.
*H04B 1/06* (2006.01)
(52) U.S. Cl. .............. 455/232.1; 455/250.1; 455/245.1
(58) Field of Classification Search .... 455/232.1–253.1
See application file for complete search history.

(56) References Cited

U.S. PATENT DOCUMENTS

| | | | | |
|---|---|---|---|---|
| 5,999,578 | A * | 12/1999 | Ha ............................. | 455/250.1 |
| 6,070,062 | A * | 5/2000 | Yoshida et al. ............ | 455/245.1 |
| 6,418,303 | B1 * | 7/2002 | Blackburn et al. ........ | 455/234.2 |
| 6,741,844 | B2 * | 5/2004 | Medvid et al. ............ | 455/232.1 |
| 7,065,335 | B2 * | 6/2006 | Ben-Ayun et al. ........ | 455/240.1 |
| 7,127,222 | B2 * | 10/2006 | Kim et al. ................ | 455/232.1 |
| 2002/0163979 | A1 * | 11/2002 | Takatz et al. ................ | 375/345 |
| 2003/0202496 | A1 * | 10/2003 | Kluge et al. ................ | 370/338 |
| 2003/0207674 | A1 * | 11/2003 | Hughes ..................... | 455/234.1 |
| 2003/0207675 | A1 * | 11/2003 | Hughes et al. ............ | 455/245.1 |
| 2004/0009758 | A1 * | 1/2004 | Graham et al. ............ | 455/234.1 |
| 2004/0097208 | A1 * | 5/2004 | Kasperkovitz ............ | 455/234.1 |
| 2005/0003783 | A1 * | 1/2005 | Ben-Ayun et al. ........ | 455/235.1 |
| 2006/0222116 | A1 * | 10/2006 | Hughes et al. ............ | 375/345 |
| 2009/0135971 | A1 * | 5/2009 | Takatz et al. ............ | 455/234.1 |

* cited by examiner

*Primary Examiner*—Lana N Le
(74) *Attorney, Agent, or Firm*—Charles W. Bethards

(57) ABSTRACT

A method for adjusting automatic gain control (AGC) of a radio receiver begins when a primary AGC module establishes an AGC setting for the radio receiver to produce a primary AGC setting. The method continues when a supervisory AGC module compares performance of the radio receiver utilizing the primary AGC setting with a plurality of performance thresholds. The method continues with the supervisory AGC module adjusting the primary AGC setting to produce adjusted AGC setting when the performance of the radio receiver utilizing the primary AGC setting compares unfavorable with a first performance threshold of the plurality of performance thresholds. The method continues with the supervisory AGC module overwriting the primary AGC setting with alternative AGC setting when the performance of the radio receiver utilizing the primary AGC setting compares unfavorable with a second performance threshold of the plurality of performance thresholds.

22 Claims, 5 Drawing Sheets

AGC module 22 radio receiver 10

AGC module 22 gain determination module 56

ADJUSTABLE AUTOMATIC GAIN CONTROL

CROSS REFERENCE TO RELATED PATENTS

NOT APPLICABLE

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

1. Technical Field of the Invention

This invention relates generally to radio technology and more particularly to automatic gain control within a radio receiver.

2. Description of Related Art

As is known, radio receivers may have a direct conversion architecture or a super heterodyne architecture. Direct conversion radio receivers convert a radio frequency (RF) signal directly to a baseband signal, while super heterodyne receivers convert a RF signal into an intermediate frequency (IF) signal and then convert the IF signal into a baseband signal. Both types of radio receivers include data recovery circuitry to recover data from the baseband signal.

While the architecture may be different, both types of radio receivers must include automatic gain control (AGC) circuitry to quickly and properly adjust the gain of a low noise amplifier (LNA) based on the signal strength of the received RF signal. If the gain of the LNA is not adjusted properly for a given RF signal, the radio receiver will not accurately recover the data embedded in the RF signal. For example, if the RF signal is weak, the gain of the LNA needs to be increased such that the radio receiver can detect the presence of a valid RF signal and then properly recover data from it. Conversely, if the signal strength of the RF signal is strong, the gain of the LNA needs to be decreased to avoid saturation of the radio receiver components and/or clipping of the signal.

To meet these difficult operating conditions, AGC circuitry is typically implemented in hardware, where, for a given range of received signal strength of the RF signal, the AGC hardware circuitry provides an LNA gain setting. Such hardware based AGC circuits provide quick and, under most conditions, provide proper gain settings for the LNA. However, hardware based AGC circuits are fixed and thus not easy to change or to be adjusted to accommodate certain operating conditions.

Software based AGC circuits overcome the limitations of the hardware based AGC circuits in that they can be readily changed and are adjustable to accommodate certain operating conditions. However, this flexibility comes at a price. For instance, to provide the speed comparable to the hardware based AGC circuits, a software based AGC circuit needs a dedicated processor, which, for most commercial applications, is too expensive. If a dedicated processor is not used, the software based AGC circuit shares the processor of the radio receiver, which typically makes the software based AGC circuit too slow.

Therefore, a need exists for a method and apparatus of adjusting AGC of a radio receiver that provides the advantages of both hardware and software based AGC circuits without the corresponding disadvantages.

BRIEF DESCRIPTION OF THE SEVERAL VIEWS OF THE DRAWING(S)

DETAILED DESCRIPTION OF THE INVENTION

Figure 1:
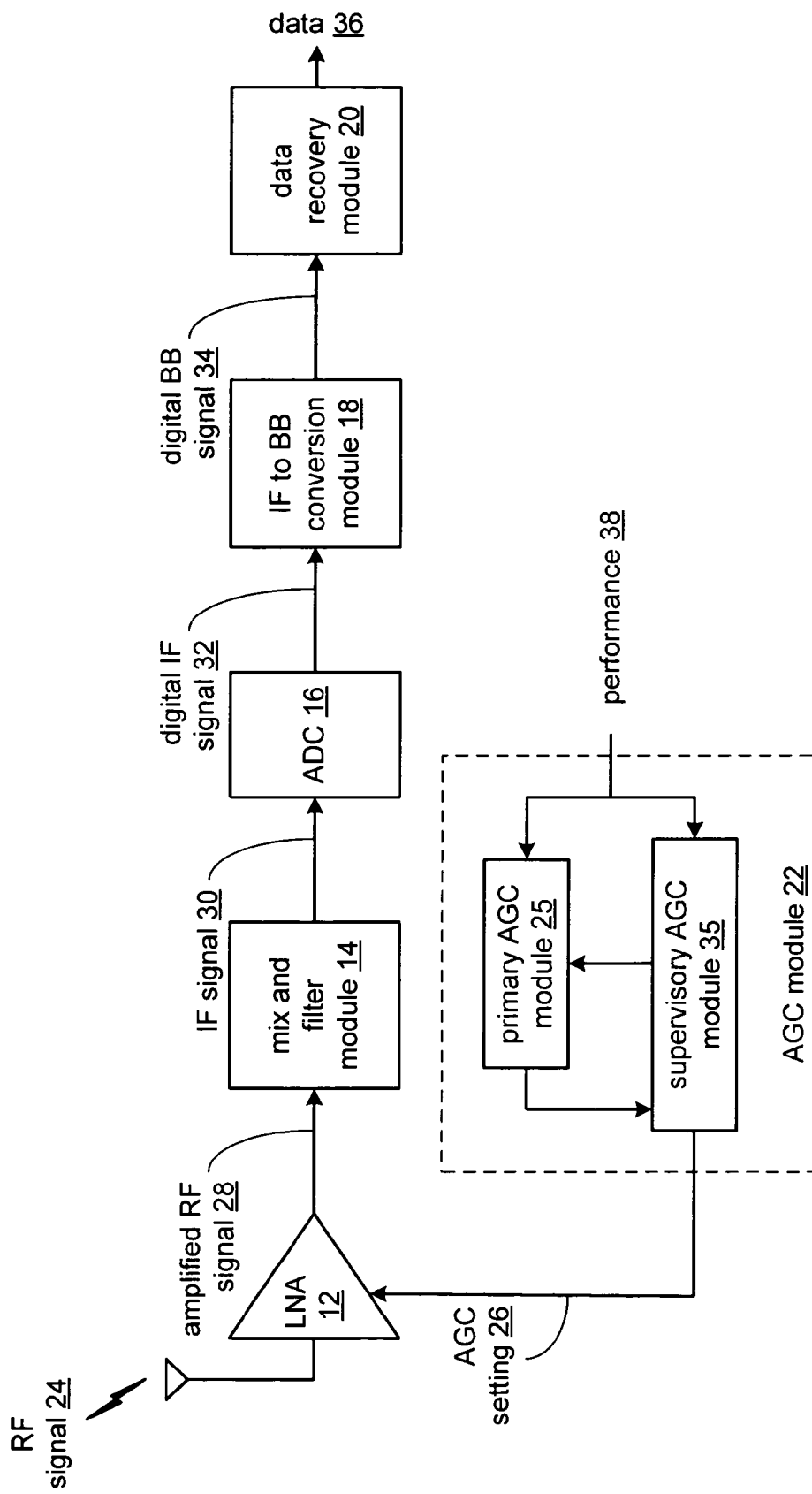
FIG. 1 is a schematic block diagram of a radio receiver in accordance with the present invention.

FIG. 1 is a schematic block diagram of a radio receiver 10 that includes a low noise amplifier (LNA) 12, a mix and filter module 14, an analog to digital conversion (ADC) module 16, an intermediate frequency (IF) to baseband (BB) conversion module 18, a data recovery module 20, and an automatic gain control (AGC) module 22. The AGC module 22 includes a primary AGC module 25 and a supervisory AGC module 35.

In operation, an antenna receives a radio frequency (RF) signal 24 and provides it to the LNA 12. The LNA 12, which may include one or more LNA stages, amplifies an RF signal 24 based on an AGC setting 26 to produce an amplified RF signal 28. The mix and filter module 14 converts the amplified RF signal 28 into an intermediate frequency signal 30. The ADC module 16, which may include one or more analog to digital converters, converts the IF signal 30 from an analog domain to a digital domain to produce a digital IF signal 32.

The IF to BB conversion module 18, which may include a digital mixer and associated local oscillation, converts the digital IF signal 32 into a digital BB signal 34. The data recovery module 20 recovers data 36 from a representation of the digital IF signal 32, which may be the digital BB signal 34. In one embodiment, the data recovery module 20 includes a sample rate conversion module, a demodulation module, a channel separation module, and an error sensing module as described in co-pending patent application entitled DIGITAL DECODER AND APPLICATIONS THEREOF, having a filing date of May 11, 2005, and a Ser. No. 11/126,864. In an alternate embodiment, the IF to BB conversion module 18 may be eliminated if the IF signal 30 is sufficiently close to DC. In such an embodiment, the data recovery module 20 recovers the data 36 from the near DC digital IF signal 32.

The primary AGC module 25 and the supervisory AGC module 35 interact to generate the AGC setting 26 based on performance 38 of the radio receiver 10. To begin, the primary AGC module 25 generates an AGC setting for the radio receiver to produce a primary AGC setting, which may include multiple settings if the LNA 12 includes multiple LNA stages. In one embodiment, the primary AGC setting is established based on the performance 38 of the radio receiver 10, which includes one or more of: wide bandwidth received signal strength indication (RSSI) of the RF signal 24, narrow bandwidth received signal strength indication of the RF signal 24, an AGC induced instability of the radio receiver, a data error rate, and signal clipping within the ADC 16 and/or data recovery module 20.

The LNA 12 uses the primary AGC setting as the AGC setting 26 to amplify the RF signal 24. The supervisory AGC module 35 compares the performance of the radio receiver utilizing the primary AGC setting with a plurality of performance thresholds. In one embodiment, the performance thresholds include a first and second threshold level for one or more of: a desired data error rate level, a desired signal to noise ratio, a desired signal clipping level, a desired ratio between the wide bandwidth RSSI to the narrow bandwidth RSSI, and amplification capabilities of the LNA 12.

When the performance of the radio receiver utilizing the primary AGC setting compares unfavorable with a first performance threshold of the plurality of performance thresholds, the supervisory AGC module adjusts the primary AGC setting to produce adjusted AGC setting. The AGC module 22 then provides the adjusted AGC setting to the LNA 12 as the AGC setting 26 and the radio receiver 10 functions as previously described with continued monitoring by the supervisory AGC module 35.

When the performance of the radio receiver utilizing the primary AGC setting compares unfavorable with a second performance threshold of the plurality of performance thresholds, the supervisory AGC module overwrites the primary AGC setting with alternative AGC setting. The AGC module 22 then provides the alternate AGC setting to the LNA 12 as the AGC setting 26 and the radio receiver 10 functions as previously described with continued monitoring by the supervisory AGC module 35. The AGC module 22 will be described in greater detail with reference to FIGS. 2-5.

Figure 2:
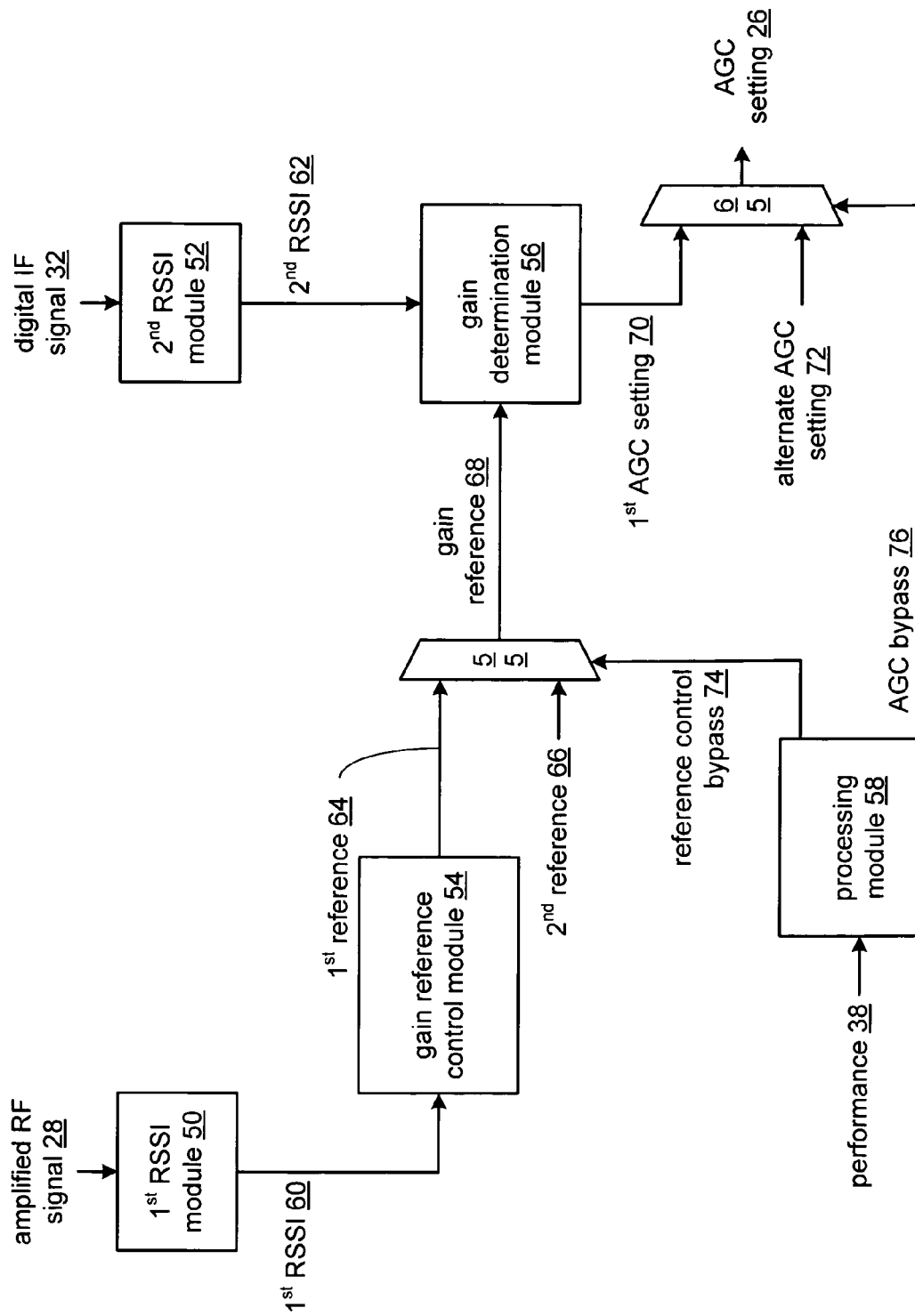
FIG. 2 is a schematic block diagram of an AGC module in accordance with the present invention.

FIG. 2 is a schematic block diagram of the AGC module 22 that includes a $1^{st}$ RSSI (received signal strength indication) module 50, a $2^{nd}$ RSSI module 52, a gain reference control module 54, a $1^{st}$ multiplexer 55, a $2^{nd}$ multiplexer 65, and a gain determination module 56 as a substantially hardware implementation of the primary AGC module 25, and a processing module 58 as a substantially software implementation of the supervisory AGC module 35. In one embodiment, modules 50, 52, 54, 56, and 58 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. One or more of the modules 50, 52, 54, 56, and 58 may have an associated memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the one or more of the modules 50, 52, 54, 56, and 58 implements one or more of its functions via a state machine, analog circuitry, digital circuitry, and/or logic circuitry, the memory element storing the corresponding operational instructions may be embedded within, or external to, the circuitry comprising the state machine, analog circuitry, digital circuitry, and/or logic circuitry. Further note that, the memory element stores, and the processing module 58 executes, hard coded and/or operational instructions corresponding to at least some of the steps and/or functions illustrated in FIGS. 2-5.

In operation, the $1^{st}$ RSSI module 50, which may be of a known construct, measures the signal strength of the amplified RF signal 28 to produce a $1^{st}$ RSSI 60. Depending on the bandwidth of the LNA 12, the amplified RF signal 28 will include a desired channel, or a desired signal at a specific carrier frequency, and may also include one or more undesired channels, or undesired signals at specific carrier frequencies. Thus, the $1^{st}$ RSSI 60 will include the signal strength of the desired channel, or signal, and any undesired channels, or signals.

The gain reference control module 54 generates a $1^{st}$ reference 64 from the $1^{st}$ RSSI 60. In one embodiment, the gain reference control module 54 functions to protect the LNA 12 from being overdriven and thus establishes the $1^{st}$ reference 64 to ensure that the LNA 12 is not overdriven. This may be done by comparing the $1^{st}$ RSSI 60 with a reference RSSI to produce an RSSI index. The RSSI index is used to determine whether a current $1^{st}$ reference should be maintained, decremented or incremented to produce an adjusted $1^{st}$ reference. The adjusted $1^{st}$ reference is then compared with a maximum value for the $1^{st}$ reference. If the adjusted $1^{st}$ reference is less than the maximum value, the adjusted $1^{st}$ reference is used as an updated $1^{st}$ reference 64. If, however, the adjusted $1^{st}$ reference is equal to or greater than the maximum value, the adjusted $1^{st}$ reference is set to the maximum value, which is used as the updated $1^{st}$ reference 64. This will be described in greater detail with reference to FIG. 4.

The processing module 58 controls the $1^{st}$ multiplexer 55 via a reference control bypass 74 to pass the $1^{st}$ reference 64 or a $2^{nd}$ reference 66, which may be generated by the processing module 58. The processing module 58 passes the $1^{st}$ reference 64 when the radio receiver performance is acceptable given the current AGC setting 26. When the radio receiver performance is not acceptable for the current AGC setting 26, the processing module 58 adjusts the AGC setting by passing the $2^{nd}$ reference 66. For example, when the signal strength of the RF signal 24 is weak and it contains negligible or strong far away undesired channels, the gain reference control module 54 may set the $1^{st}$ reference too low for the given RF signal 24, which may cause an oscillation. Thus, under these conditions, the supervisory AGC module 35 generates the $2^{nd}$ reference 66 to provide a desired gain reference 68 for the gain determination module 56 and, as such, has adjusted the AGC setting produced by the primary AGC module 25.

The $2^{nd}$ RSSI module 52 measures the signal strength of the digital IF signal 32 to produce a $2^{nd}$ RSSI 62. Since the mix and filter module 14 substantially filters the undesired channels, or signals, from the RF signal 24, the digital IF signal 32 is representative of the desired channel, or signal, with negligible energy of the undesired channels, or signals. Thus, the $2^{nd}$ RSSI 62 is a narrow bandwidth measure of the signal strength of the RF signal in comparison with the $1^{st}$ RSSI 60.

The gain determination module 56, which will be described in greater detail with reference to FIG. 3, generates a $1^{st}$ AGC setting 70 based on the $2^{nd}$ RSSI 62 and the gain reference 68. In one embodiment, the gain determination module 56 utilizes the gain reference 68 as an upper threshold and uses the $2^{nd}$ RSSI 62 to determine an offset from the upper threshold to establish the $1^{st}$ AGC setting 70.

The processing module 58 monitors the performance 38 of the radio receiver 10 with the $1^{st}$ AGC setting 70 and, when the performance 38 falls below the second threshold, the processing module enables the AGC bypass 76 to pass an alternate AGC setting 72 as the AGC setting 26. For example, when the RF signal 24 contains significant energy from undesired channels with respect to the desired channel, setting the AGC setting 26 (i.e., the LNA gain) based on the $2^{nd}$ RSSI 62, which primarily indicates the energy of the desired channel, may cause the LNA 12 to be overdriven due to the energy of the undesired channels. Thus, in this instance, the $1^{st}$ AGC setting 70 produced by the primary AGC module 25 should be overwritten with an AGC setting that does not overdrive, or saturate, the LNA 12. Note that in one embodiment, the processing module 58 may compare the $1^{st}$ RSSI 60 with the $2^{nd}$ RSSI 62 to determine whether to overwrite the $1^{st}$ AGC setting 70.

As one of ordinary skill in the art will appreciate, the processing module 58 may be a shared processing module 58 with other functions of the radio receiver 10 or another device (e.g., a digital audio processing circuit such as an MP3 player) coupled to the radio receiver 10. As one of ordinary skill in the art will further appreciate, the radio receiver 10 may be implemented on an integrated circuit as a stand alone device or may be implemented on an integrated circuit containing a digital audio processing circuit.

Figure 3:
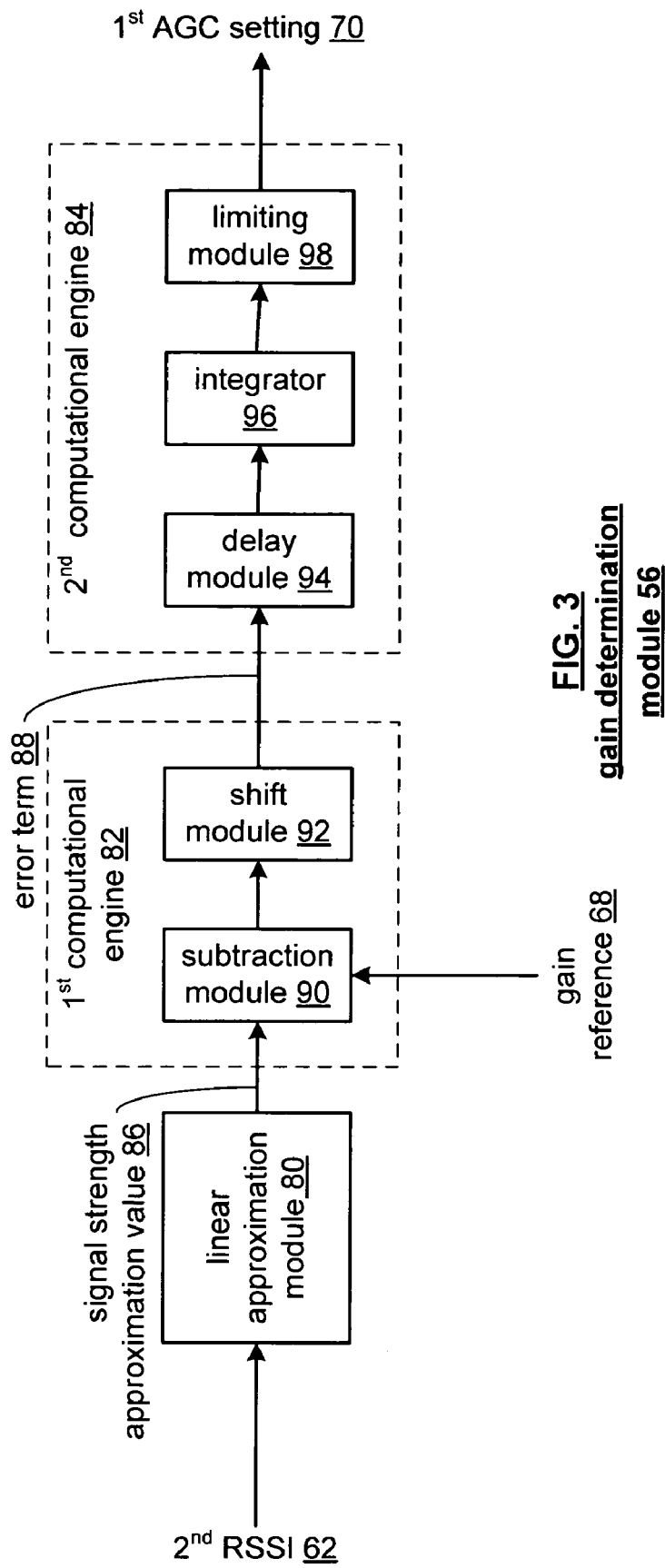
FIG. 3 is a schematic block diagram of a gain determination module in accordance with the present invention.

FIG. 3 is a schematic block diagram of a gain determination module 56 that includes a linear approximation module 80, a $1^{st}$ computational engine 82, and a $2^{nd}$ computational engine 84. The $1^{st}$ computational engine 82 includes a subtraction module 90 and a shift module 92. The $2^{nd}$ computational engine 84 includes a delay module 94, an integrator 96, and a limiting module 98.

In operation, the linear approximation module 80 generates a signal strength approximation value 86 from the $2^{nd}$ RSSI 62. In one embodiment, the linear approximation module 80 is a piece-wise linear approximation state machine that emulates a $20*\log_{10}(2^{nd}$ RSSI$)$ function to obtain the signal strength approximation value 86. The subtraction module 90 subtracts the signal strength approximation value 86 from the gain reference 68 to produce a gain difference. The shift module 92 performs a $2^n$ function upon the gain difference to produce an error term 88. Note that n is programmable via a register.

The delay module 94 delays the error term 88 by a processing period of the AGC module 22 to produce a delayed error term. The integrator 96 performs a first order integration on the delayed error term to produce an integrated error term. The limiting module 98, when needed, limits the integrated error term to produce the $1^{st}$ AGC setting 70.

Figure 4:
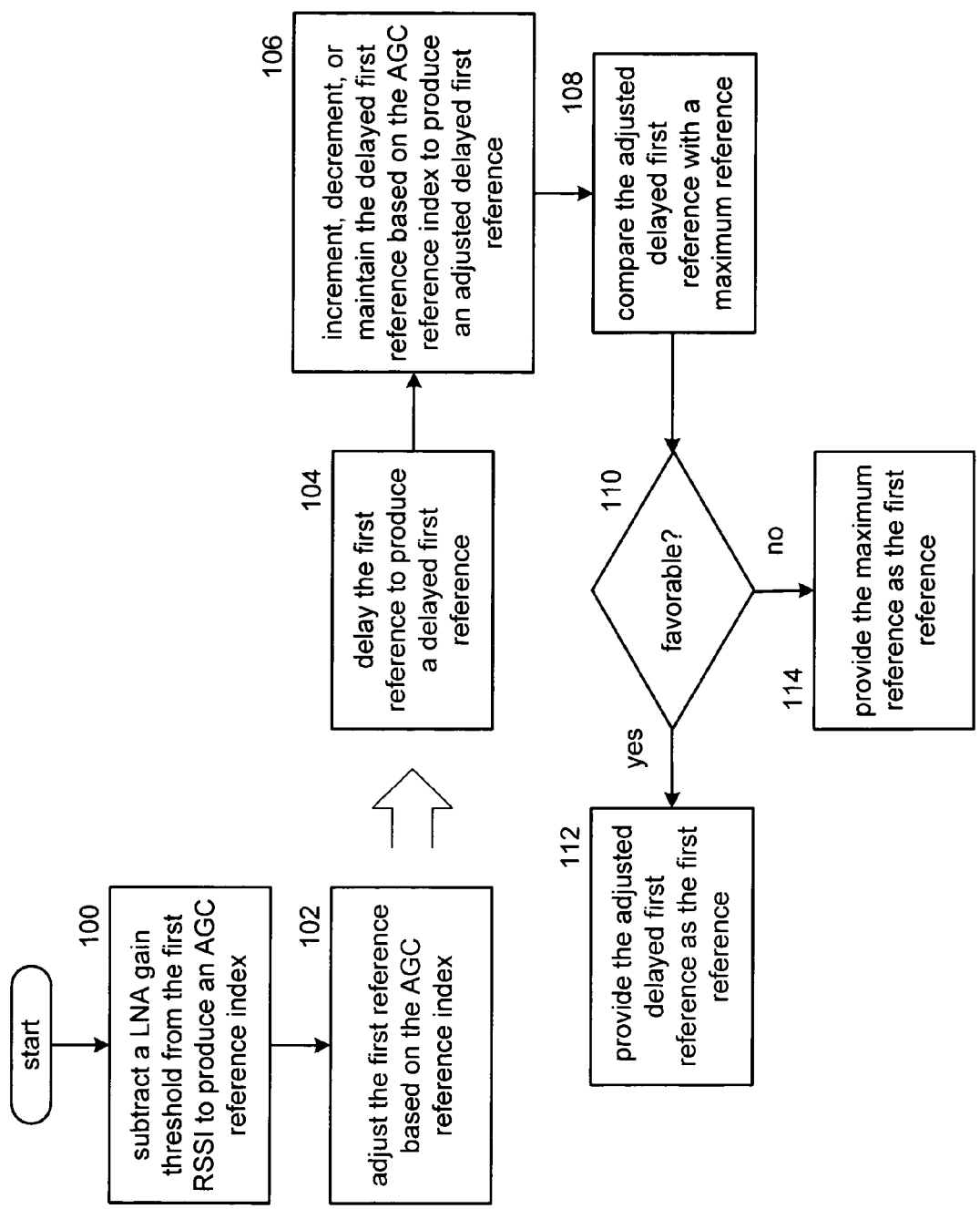
FIG. 4 is a logic diagram of a method for adjusting a gain reference in accordance with the present invention.

FIG. 4 is a logic diagram of a method for adjusting a gain reference that may be performed by the gain reference control module 54 and/or the processing module 58. The method begins at step 100 where the gain reference control module 54 subtracts a low noise amplifier gain threshold (e.g., an optimal RSSI value for the received RF signal) from the first RSSI to produce an AGC reference index. The method proceeds to step 102, wherein the gain reference control module adjusts the first reference based on the AGC reference index.

Step 102 may be further described with reference to steps 104-114. At step 104, the gain reference control module delays the first reference to produce a delayed first reference. The method then proceeds to step 106 where the gain reference control module increments, decrements, or maintains the delayed first reference based on the AGC reference index to produce an adjusted delayed first reference. The method then proceeds to step 108 where the gain reference control module compares the adjusted delayed first reference with a maximum reference. The method then proceeds to step 110 where when the comparison is favorable, the method continues at step 112 and when the comparison is not favorable, the method continues at step 114. At step 112, the gain reference control module provides the adjusted delayed first reference as the first reference. At step 114, the gain reference control module provides the maximum reference as the first reference.

Figure 5:
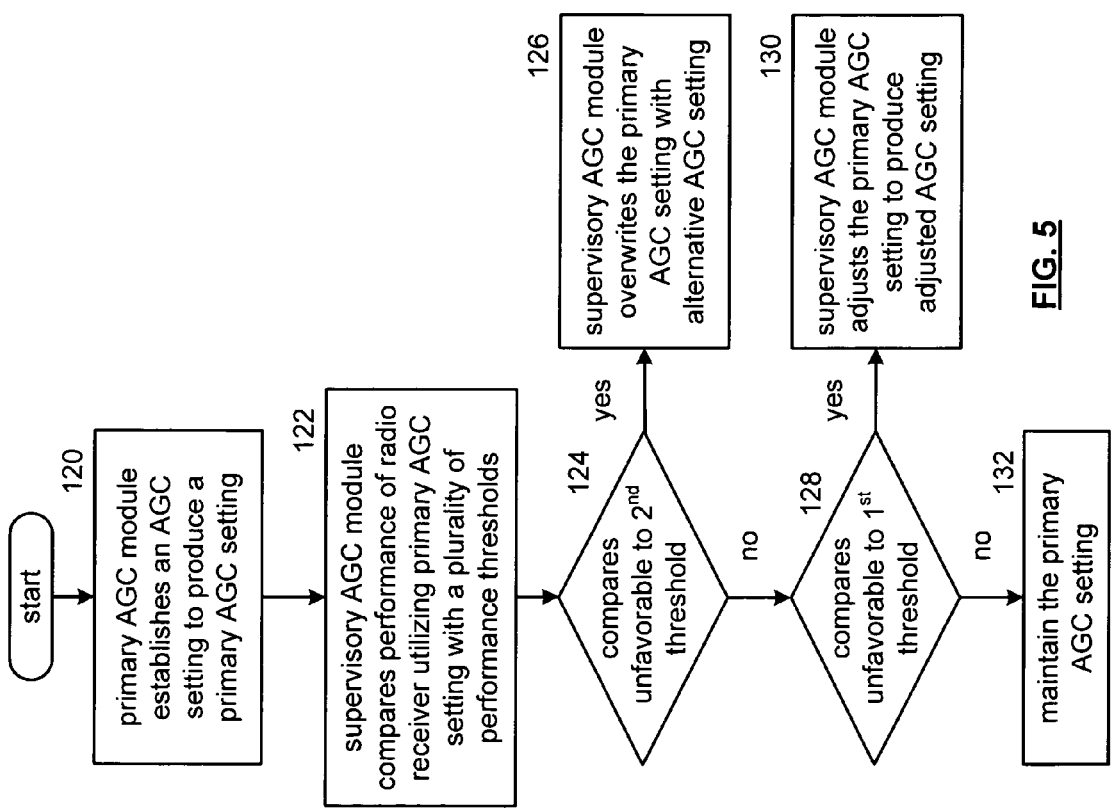
FIG. 5 is a logic diagram of a method for AGC in accordance with the present invention.

FIG. 5 is a logic diagram of a method for AGC that begins at step 120 where a primary AGC module establishes an AGC setting for the radio receiver to produce a primary AGC setting. In one embodiment, the primary AGC module is a hardware AGC module that is operable to select the primary AGC setting from one of a plurality of AGC settings based on signal strength of a received radio frequency (RF) signal. For example, the hardware AGC module may include modules 50, 52, 54, 55, 56 and 65 of the AGC module 22 of FIG. 2.

The method then proceeds to step 122 where a supervisory AGC module compares performance of the radio receiver utilizing the primary AGC setting with a plurality of performance thresholds. The performance of the radio receiver includes one or more of: wide bandwidth received signal strength indication of a received radio frequency (RF) signal, narrow bandwidth received signal strength indication of the received RF signal, AGC induced instability of the radio receiver, data error rate, SNR, spectral purity, and signal clipping.

The method then proceeds to step 124 where the supervisory module compares the performance with a second threshold of the plurality of performance thresholds. When the performance of the radio receiver utilizing the primary AGC setting compares unfavorable with a second performance threshold of the plurality of performance thresholds, the method proceeds to step 126 where the supervisory AGC module overwrites the primary AGC setting with alternative AGC setting. In one embodiment, the supervisory AGC module determines the alternative AGC setting based on the performance of the radio receiver. For example, when the supervisory AGC module determines that the data error rate exceeds a data error rate threshold or that a signal within the radio receiver is clipped, it overwrites the primary AGC setting with the alternate setting such that the data error rate is less than the data error rate threshold and/or such that the clipping is eliminated or substantially reduced. As another example, when the supervisory AGC module detects an AGC induced instability of the radio receiver, it overwrites the primary AGC setting to substantially reduce or eliminate the AGC induced instability of the radio receiver.

If the comparison of step 124 is favorable, the method proceeds to step 128 where the supervisory AGC module compares the performance of the radio receiver with a first performance threshold of the plurality of performance thresholds. When the comparison is favorable, the method proceeds to step 132, where the primary AGC setting is maintained as the AGC setting. If, however, the comparison was not favorable, the method proceeds to step 130 where the supervisory AGC module adjusts the primary AGC setting to produce adjusted AGC setting. In one embodiment, the supervisory AGC module determines the adjusting of the primary AGC setting based on the primary AGC setting and the performance of the radio receiver. For example, the supervisory AGC module may compare the performance of the radio receiver by: comparing the narrow bandwidth received signal strength indication with a weak signal threshold; when the narrow bandwidth received signal strength indication compares unfavorably with the weak signal threshold, comparing the wide bandwidth received signal strength indication with the narrow bandwidth received signal strength indication; and when the wide bandwidth received signal strength indication is within a tolerance range of the narrow bandwidth received signal strength indication, indicating that the performance of the radio receiver utilizing the primary AGC setting compares unfavorably with the first performance threshold. In an alternate embodiment, the steps 124 and 126 may not actually be present in the system, and in such a case, step 122 proceeds directly to step 128.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "operably associated with", as may be used herein, includes direct and/or indirect coupling of separate components and/or one component being embedded within another component. As one of ordinary skill in the art will still further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for automatic gain control in a radio receiver, which may be a frequency modulated (FM) radio receiver. As one of ordinary skill in the art will appreciate, other embodiments may be derived from the teachings of the present invention without deviating from the scope of the claims.

What is claimed is:

1. A method for adjusting automatic gain control (AGC) of a radio receiver, the method comprises:
    establishing, by a primary AGC module, an AGC setting for the radio receiver to produce a primary AGC setting;
    comparing, by a supervisory AGC module, performance of the radio receiver utilizing the primary AGC setting with a plurality of performance thresholds, at least on of the plurality of performance thresholds corresponding to a radio of wide bandwidth signal strength indication and a narrow bandwidth signal strength indication; and
    when the performance of the radio receiver utilizing the primary AGC setting compares unfavorable with a first performance threshold of the plurality of performance thresholds, adjusting, by the supervisory AGC module, the primary AGC setting to produce an adjusted AGC setting:
    wherein the comparing the performance of the radio receiver further comprises:
    comparing the narrow bandwidth signal indication with a weak signal threshold;
    when the narrow bandwidth received signal strength indication compares unfavorably with the weak signal threshold, comparing the wide bandwidth received signal strength indication with the narrow bandwidth received signal strength indication; and
    when the wide bandwidth received signal strength indication is within a tolerance range of the narrow bandwidth received signal strength indication, indicating that the performance of the radio receiver utilizing the primary AGC setting compares unfavorably with the first performance threshold.

2. The method of claim 1 further comprises:
    when the performance of the radio receiver utilizing the primary AGC setting compares favorably with the first performance threshold, maintaining, by the supervisory AGC module, the primary AGC setting.

3. The method of claim 1, wherein the primary AGC module comprises:
    a hardware AGC module operable to select the primary AGC setting from one of a plurality of AGC settings based on signal strength of a received radio frequency (RF) signal.

4. The method of claim 1 further comprises:
    when the performance of the radio receiver utilizing the primary AGC setting compares unfavorable with a second performance threshold of the plurality of performance thresholds, overwriting, by the supervisory AGC module, the primary AGC setting with alternative AGC setting.

5. The method of claim 4, wherein the supervisory AGC module comprises:
    a software AGC module operably coupled to:
    determine the adjusting of the primary AGC setting based on the primary AGC setting and the performance of the radio receiver; and
    determine the alternative AGC setting based on the performance of the radio receiver.

6. The method of claim 5, wherein the performance of the radio receiver comprises at least one of:
    the wide bandwidth received signal strength indication of a received radio frequency (RF) signal;
    the narrow bandwidth received signal strength indication of the received RF signal;
    AGC induced instability of the radio receiver;
    data error rate;
    signal to noise ratio (SNR);
    spectral purity; and
    signal clipping.

7. The method of claim 6, wherein the comparing the performance of the radio receiver comprises:
    determining whether the data error rate exceeds a data error rate threshold or whether a signal within the radio receiver is clipped; and
    when the data error rate exceeds the data error rate threshold or when the signal within the radio receiver is clipped, indicating that the performance of the radio receiver utilizing the primary AGC setting compares unfavorable with the second performance threshold.

8. The method of claim 6, wherein the comparing the performance of the radio receiver comprises:
    when the AGC induced instability of the radio receiver is detected, indicating that the performance of the radio receiver utilizing the primary AGC setting compares unfavorable with the second performance threshold.

9. An automatic gain control (AGC) module comprises:
    a first bandwidth received signal strength indication (RSSI) module operably coupled to provide a first RSSI of a received radio frequency (RF) signal;
    a second RSSI module operably coupled to provide a second RSSI of an intermediate frequency (IF) signal, wherein the IF signal is derived from the RF signal;
    gain reference control module operably coupled to produce a first reference based on the first RSSI;

gain determination module operably coupled to produce a first AGC setting based on the second RSSI and a gain reference;

processing module operably coupled to:
provide a second reference as the gain reference to the gain determination module when a reference control bypass is enabled and to provide the first reference as the gain reference to the gain determination module when the reference control bypass is not enabled; and
output an alternate AGC setting when an AGC bypass is enabled and to output the first AGC setting when the AGC bypass is not enabled.

10. The AGC module of claim 9, wherein the gain determination module comprises:
a linear approximation module operably coupled to produce a signal strength approximation value based on the second RSSI;
a first computational engine operably coupled to produce an error term from the signal strength approximation and the gain reference;
second computational engine operably coupled to convert the error term into the first AGC setting.

11. The AGC module of claim 10, wherein the linear approximation module comprises:
a piece-wise linear approximation state machine operably coupled to provide, as the signal strength approximation, a logarithmic approximation based on the second RSSI.

12. The AGC module of claim 11 further comprises:
the first computational engine including:
a subtraction module operably coupled to subtract the logarithmic approximation from the gain reference to produce a gain difference; and
shifting module operably coupled to left shift the gain difference based on a AGC left shift factor to produce the error term;
the second computation engine including:
a delay module operably coupled to delay the error term to produce a delayed error term;
an integrator operably coupled to integrate the delayed error term to produce an integrated error term; and
a limiting module operably coupled to limit the integrated error term to produce the first AGC setting.

13. The AGC module of claim 9, wherein the gain reference control module functions to:
subtract a low noise amplifier gain threshold from the first RSSI to produce an AGC reference index; and
adjust the first reference based on the AGC reference index.

14. The AGC module of claim 13, wherein the gain reference control module further functions to adjust the first reference by:
delaying the first reference to produce a delayed first reference;
incrementing, decrementing, or maintaining the delayed first reference based on the AGC reference index to produce an adjusted delayed first reference;
comparing the adjusted delayed first reference with a maximum reference;
when the adjusted delayed first reference compares favorably with the maximum reference, providing the adjusted delayed first reference as the first reference; and
when the adjusted delayed first reference compares unfavorably with the maximum reference, providing the maximum reference as the first reference.

15. A radio comprises:
a low noise amplifier operably coupled to amplify a radio frequency (RF) signal based on an automatic gain control (AGC) setting to produce an amplified RF signal;
mix and filer module operably coupled to convert the amplified RF signal into an intermediate frequency (IF) signal;
analog to digital converter operably coupled to convert the IF signal into a digital IF signal;
data recovery module operably coupled to produce data from a representation of the digital IF signal;
a primary AGC module operably coupled to produce a primary AGC setting;
a supervisory AGC module operably coupled to:
compare performance of the radio utilizing the primary AGC setting as the AGC setting with a plurality of performance thresholds, at least one of the plurality of performance thresholds corresponding to a desired radio performance parameter; and
when the performance of the radio utilizing the primary AGC setting compares unfavorable with a first performance threshold of the plurality of performance thresholds, adjust the primary AGC setting to produce an adjusted AGC setting, wherein the adjusted AGC setting is used as the AGC setting;
wherein the supervisory AGC module compares the performance of the radio by:
determining whether a data error rate exceeds a data error rate threshold or whether a signal within the radio receiver is clipped; and
when the data error rate exceeds the data error rate threshold or when the signal within the radio receiver is clipped, indicating that the performance of the radio receiver utilizing the primary AGC setting compares unfavorable with the second performance threshold.

16. The radio of claim 15, wherein the supervisory AGC module further functions to:
when the performance of the radio utilizing the primary AGC setting compares favorably with the first performance threshold, provide the primary AGC setting as the AGC setting.

17. The radio of claim 15, wherein the primary AGC module comprises:
a hardware AGC module operable to select the primary AGC setting from one of a plurality of AGC settings based on signal strength of the RF signal and a reference gain.

18. The radio of claim 15, wherein the supervisory AGC module is further operably coupled to:
when the performance of the radio utilizing the primary AGC setting compares unfavorable with a second performance threshold of the plurality of performance thresholds, overwrite the primary AGC setting with alternative AGC setting, wherein the alternate AGC setting is used as the AGC setting.

19. The radio of claim 18, wherein the supervisory AGC module comprises:
a software AGC module operably coupled to:
determine the adjusting of the primary AGC setting based on the primary AGC setting and the performance of the radio; and
determine the alternative AGC setting based on the performance of the radio.

20. The radio of claim 19, wherein the performance of the radio comprises at least one of:
wide bandwidth received signal strength indication of the RF signal;

narrow bandwidth received signal strength indication of the received RF signal;

AGC induced instability of the radio;

the data error rate;

signal to noise ratio (SNR);

spectral purity; and signal clipping.

21. The radio of claim 20, wherein the supervisory AGC module compares the performance of the radio by:

comparing the narrow bandwidth received signal strength indication with a weak signal threshold;

when the narrow bandwidth received signal strength indication compares unfavorably with the weak signal threshold, comparing the wide bandwidth received signal strength indication with the narrow bandwidth received signal strength indication; and when the wide bandwidth received signal strength indication is within a tolerance range of the narrow bandwidth received signal strength indication, indicating that the performance of the radio receiver utilizing the primary AGC setting compares unfavorably with the first performance threshold.

22. The radio of claim 20, wherein the supervisory AGC module compares the performance of the radio by:

when the AGC induced instability of the radio receiver is detected, indicating that the performance of the radio receiver utilizing the primary AGC setting compares unfavorable with the second performance threshold.

* * * * *

UNITED STATES PATENT AND TRADEMARK OFFICE
CERTIFICATE OF CORRECTION

| | | |
|---|---|---|
| PATENT NO. | : 7,620,380 B2 | Page 1 of 1 |
| APPLICATION NO. | : 11/388795 | |
| DATED | : November 17, 2009 | |
| INVENTOR(S) | : Hendrix et al. | |

It is certified that error appears in the above-identified patent and that said Letters Patent is hereby corrected as shown below:

Title page 1 of the patent please insert --Assignee: SigmaTel, Inc. Austin, TX (US)--

Signed and Sealed this
Fifteenth Day of February, 2011

David J. Kappos
*Director of the United States Patent and Trademark Office*